(12) United States Patent
Yamaji et al.

(10) Patent No.: US 8,583,409 B2
(45) Date of Patent: Nov. 12, 2013

(54) NUCLEAR-CHARACTERISTIC CALCULATING PROGRAM AND ANALYZING APPARATUS

(75) Inventors: Kazuya Yamaji, Tokyo (JP); Hiroki Koike, Tokyo (JP); Daisuke Sato, Tokyo (JP); Shinobu Tsubota, Tokyo (JP); Hideki Matsumoto, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 216 days.

(21) Appl. No.: 13/206,219

(22) Filed: Aug. 9, 2011

(65) Prior Publication Data

US 2012/0209576 A1    Aug. 16, 2012

(30) Foreign Application Priority Data

Feb. 14, 2011 (JP) .................................. 2011-029162

(51) Int. Cl.
*G06F 17/17* (2006.01)
*G06N 7/06* (2006.01)

(52) U.S. Cl.
USPC ................... 703/6; 703/2; 376/267; 434/218

(58) Field of Classification Search
None
See application file for complete search history.

(56) References Cited

U.S. PATENT DOCUMENTS

2005/0192764 A1*  9/2005  Holland .......................... 702/28

FOREIGN PATENT DOCUMENTS

JP   2005-338042 A   12/2005
JP   2007-192550 A   8/2007

OTHER PUBLICATIONS

Cacuci, D. G. (2010), Handbook of nuclear engineering. (2010 ed., vol. 1, pp. 1249-1251). New York, NY: Springer Science Business Media LLC.*
Yamaji et al., Validation of a New Lattice Physics Code GALAXY for PWRs, Proceedings of the 18th International Conference on Nuclear Engineering, May 17-21, 2010—Teaches anisotropic scattering treatment using the spherical harmonics function of variable Legendre polynomial order, and burn-up calculation based on the predictor-corrector procedure.*
Yamamoto et al., Projected Predictor-Corrector Method for Lattice Physics Burnup Calculations, Nuclear Science and Engineering: 163, 144-151 (2009)—Teaches an improved predictor-corrector method for burnup calculation especially useful for Gd-bearing fuel assemblies.*
Yamaji, Kazuya et al "Treatments of Anisotropic scattering in Fuel Assemblies with Gd Fuel Rods," 2010 Fall Meeting of the Atomic Energy Society of Japan, Sep. 15-17, 2010, Q48.

* cited by examiner

*Primary Examiner* — Kamini S Shah
*Assistant Examiner* — Michael P Healey
(74) *Attorney, Agent, or Firm* — Westerman, Hattori, Daniels & Adrian, LLP

(57) ABSTRACT

A nuclear-characteristic calculating program for calculating a nuclear characteristic of a fuel rod that contains nuclear fuel and burnable poison includes a first scattering model that can represent a simple scattering of the neutron and a second scattering model that can represent a complicated scattering of the neutron. The nuclear-characteristic calculating program includes step of calculating, when a burnup of the fuel rod is before a set burnup at which the burnable poison is considered to lose neutron absorption capability, the nuclear characteristic of the fuel rod by using the second scattering model, step of switching, when the burnup of the fuel rod is the set burnup, the scattering model from the second scattering model to the first scattering model, and step of calculating, after performing step of switching, the nuclear characteristic of the fuel rod by using the first scattering model.

2 Claims, 5 Drawing Sheets

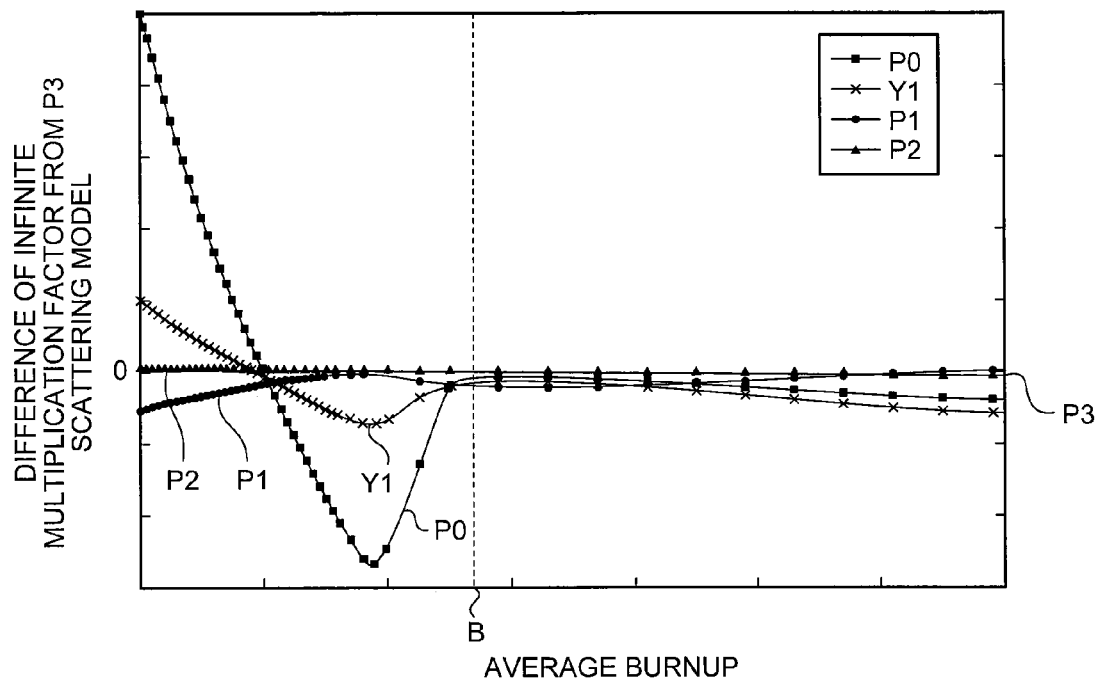

| SCATTERING MODEL | CALCULATION TIME [RELATIVE VALUE] | SWITCH TO TRANSPORT CORRECTION Y1 |
|---|---|---|
| P0 | 1.0 | - |
| TRANSPORT CORRECTION Y1 | 1.0 | - |
| P1 | 1.4 | 1.3 |
| P2 | 1.9 | 1.6 |
| P3 | 2.5 | - |

NUCLEAR-CHARACTERISTIC CALCULATING PROGRAM AND ANALYZING APPARATUS

TECHNICAL FIELD

The present invention relates to a nuclear-characteristic calculating program for calculating a nuclear characteristic of a fuel rod that contains nuclear fuel and burnable poison and to an analyzing apparatus.

BACKGROUND ART

There has been known a criticality safety design program that employs the Legendre function as a scattering model for obtaining a scattering cross section of a neutron that transfers from one energy group to another energy group (see, for example, Patent Literature 1). In this criticality safety design program, the zeroth order and the first order of the Legendre order are used to obtain the scattering cross section.

CITATION LIST

Patent Literature

[PTL 1] JP 2005-338042A

SUMMARY OF INVENTION

Technical Problem

However, when the fuel rod contains burnable poison, a scattering behavior of a neutron in the early stage of the nuclear reaction shows an anisotropic scattering compared to a case in which the fuel rod does not contain the burnable poison, that is, the scattering of the neutron becomes complicated, because the burnable poison is a strong neutron absorber. Therefore, it is not possible to represent the behavior of the neutron in an accurate manner with a simple scattering model. In this case, although it can be considered to represent the behavior of the neutron by using a scattering model in which the Legendre order becomes a higher order, that is, a scattering model that can represent the complicated scattering of the neutron, it causes a heavy calculation load because the scattering model employs a higher-order approximation, resulting in a long calculation time with an increased calculation cost.

In view of the above aspects, an object of the present invention is to provide a nuclear-characteristic calculating program that can suppress an increase of a calculation time without degrading the calculation accuracy in calculation of a nuclear characteristic of a fuel rod containing burnable poison and an analyzing apparatus that uses the nuclear-characteristic calculating program.

Solution to Problem

According to an aspect of the present invention, a non-transitory computer readable media includes a nuclear-characteristic calculating program executable by a processor for calculating a nuclear characteristic of a fuel rod that contains nuclear fuel and burnable poison that loses neutron absorption capability with a neutron absorption reaction of absorbing a neutron. The nuclear-characteristic calculating program includes: a first scattering model that can represent a simple scattering of the neutron with light calculation load as a scattering model for representing a scattering of the neutron; a second scattering model that can represent a complicated scattering of the neutron with heavy calculation load compared to the first scattering model as a scattering model for representing a scattering of the neutron; a first nuclear-characteristic calculating module for calculating, when a burnup of the fuel rod is before a set burnup at which the burnable poison is considered to lose the neutron absorption capability, the nuclear characteristic of the fuel rod by using the second scattering model; a scattering-model switching module for switching, when the burnup of the fuel rod is the set burnup, the scattering model from the second scattering model to the first scattering model; and a second nuclear-characteristic calculating module for calculating, after switching the scattering model, the nuclear characteristic of the fuel rod by using the first scattering model.

According to this configuration, because the scattering of the neutron becomes anisotropic before the burnable poison loses the neutron absorption capability so that the scattering of the neutron becomes complicated, it is possible to evaluate the behavior of the neutron in an accurate manner at the time of the neutron scattering by using the second scattering model. On the other hand, if the burnable poison loses the neutron absorption capability, the influence of the anisotropic scattering of the neutron is decreased so that it is possible to represent the scattering of the neutron with a simple scattering model, and therefore, it is possible to evaluate the behavior of the neutron in an accurate manner at the time of the neutron scattering by using the first scattering model. With this configuration, it is possible to shorten the calculation time without degrading the calculation accuracy, compared to a conventional case in which the nuclear characteristic of the fuel rod is evaluated by only using the higher-order scattering model.

Advantageously, in the non-transitory computer readable media of claim 1, each of the first nuclear-characteristic calculating and the second nuclear-characteristic calculating includes calculating the nuclear characteristic of the fuel rod based on a prediction nuclear characteristic that serves as a predictor and a correction nuclear characteristic that serves as a corrector, and at a time of performing the scattering-model switching, the nuclear characteristic of the fuel rod is calculated based on the prediction nuclear characteristic calculated using the second scattering model at the first nuclear-characteristic calculating and the correction nuclear characteristic calculated using the first scattering model at the second nuclear-characteristic calculating.

According to this configuration, at the time of switching the scattering models, it is possible to suppress a shift of the nuclear characteristic when changing the nuclear characteristic from the nuclear characteristic of the fuel rod calculated using the second scattering model to the nuclear characteristic of the fuel rod calculated using the first scattering model. With this configuration, even at the time of switching the scattering models, it is possible to suppress a discontinuity of the calculated nuclear characteristic.

An analyzing apparatus includes the non-transitory computer readable media of any of above being configured to execute the nuclear-characteristic calculating program.

According to this configuration, by using the nuclear-characteristic calculating program, it is possible to calculate the nuclear characteristic of the fuel rod that contains the burnable poison in an appropriate manner while suppressing an increase of the calculation time.

Advantageous Effects of Invention

With the nuclear-characteristic calculating program and the analyzing apparatus according to the present invention, it is possible to suppress an increase of the calculation time without degrading the calculation accuracy in the nuclear characteristic of the fuel rod by switching scattering models between the first scattering model and the second scattering model.

BRIEF DESCRIPTION OF DRAWINGS

FIG. 3 is a graph showing an error of a scattering model that can represent a simple neutron scattering with respect to a scattering model that can represent a complicated neutron scattering.

FIG. 4 is a table showing calculation times of scattering models.

DESCRIPTION OF EMBODIMENTS

Exemplary embodiments of a nuclear-characteristic calculating program and an analyzing apparatus according to the present invention will be explained below in detail with reference to the accompanying drawings. The present invention is not limited to the following embodiments. In addition, constituent elements in the following embodiments include elements replaceable by those skilled in the art, or substantially the same elements.

Embodiments

A nuclear-characteristic calculating program according to the present embodiment is a program for evaluating the nuclear characteristic of a fuel rod that contains burnable poison. The nuclear-characteristic calculating program is, for example, a nuclear-constant calculation code for calculating the nuclear characteristic such as an atom number density N, effective multiplication factor, infinite multiplication factor, and output. A burnup calculating program is embedded in the nuclear-constant calculation code for calculating the nuclear constant of a fuel assembly loaded in a reactor core. The nuclear-constant calculation code embedded with the burnup calculating program is explained first with reference to FIG. 1.

Figure 1:
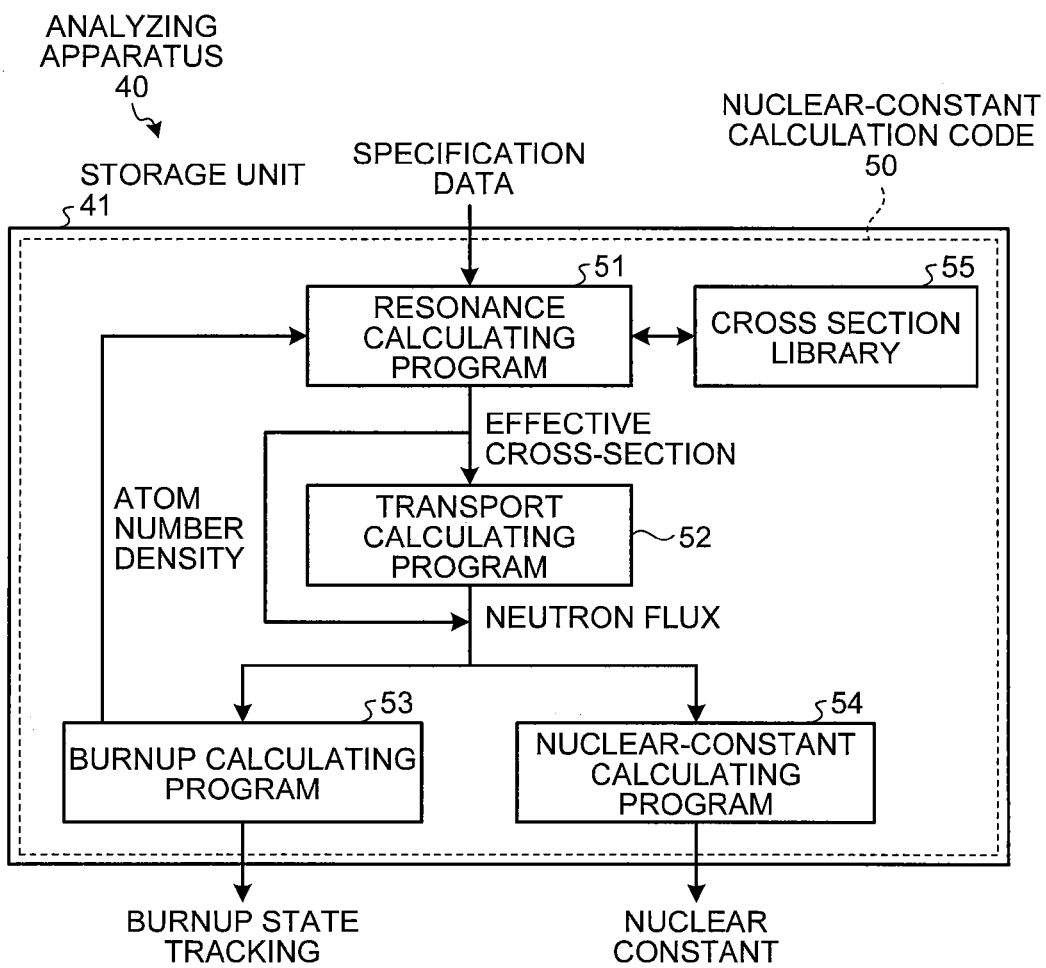
FIG. 1 is a schematic diagram for explaining an analyzing apparatus in which a nuclear-constant calculation code according to an embodiment of the present invention is stored.
Figure 2:
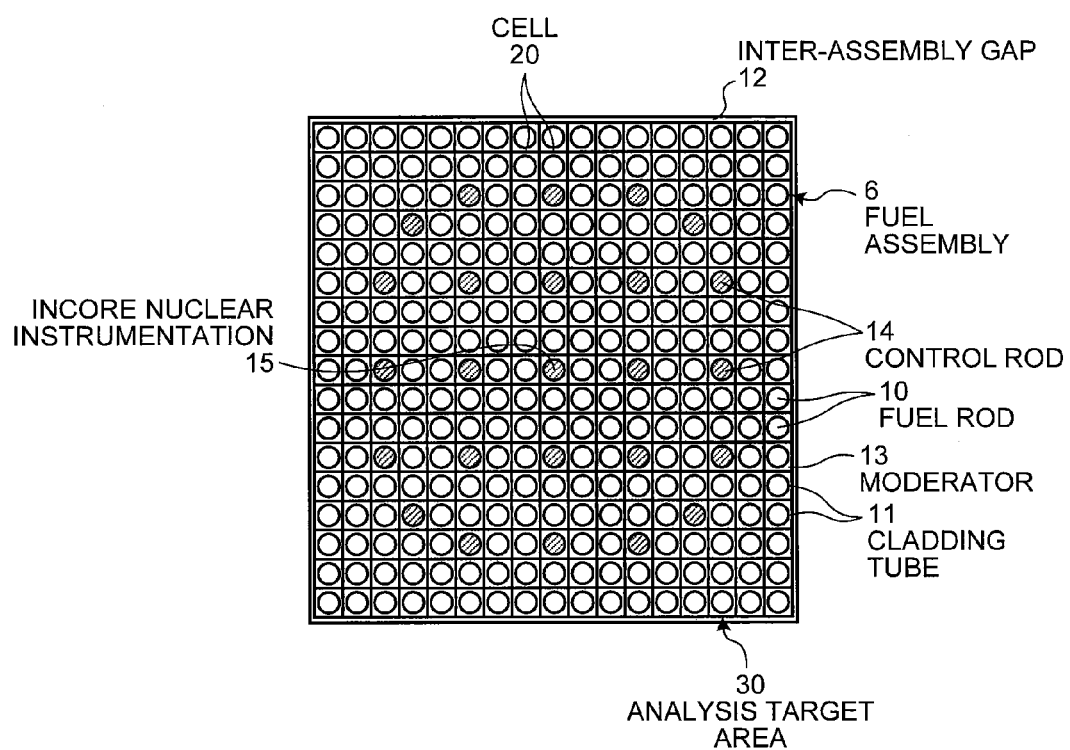
FIG. 2 is a cross-sectional view of a fuel assembly as an analysis target area cut along a plane perpendicular to an axial direction.

FIG. 1 is a schematic diagram for explaining an analyzing apparatus (40) in which a nuclear-constant calculation code (50) according to the present embodiment is stored, and FIG. 2 is a cross-sectional view of a fuel assembly (6) as an analysis target area (30) cut along a plane perpendicular to an axial direction. As shown in FIG. 1, the nuclear-constant calculation code (50) is a program that can be executed on the analyzing apparatus (hardware) (40), which is stored in a storage unit (41) of the analyzing apparatus (40). The nuclear-constant calculation code (50) takes a quadrangular geometric shape that is a cross section of the fuel assembly (6) cut along the plane perpendicular to the axial direction as the two-dimensional analysis target area (30) (see FIG. 2), which is a code with which the nuclear constant can be calculated in the analysis target area (30). The nuclear constant is input data used in a core calculation, which includes diffusion coefficient, absorption cross section, removal cross section, and formation cross section. That is, by performing a nuclear constant calculation using the nuclear-constant calculation code (50), the nuclear constant that is input data for the core calculation is generated.

As shown in FIG. 2, the fuel assembly (6) that becomes the analysis target area (30) is constituted by a plurality of fuel rods (10), a plurality of cladding tubes (11) respectively covers the fuel rods (10), and a grid (not shown) that bundles the cladding tubes (11). Inside of the fuel assembly (6) is filled with a moderator (coolant) 13, and the fuel assembly (6) is configured in such a manner that a plurality of control rods (14) and an incore nuclear instrumentation (15) can be inserted.

The fuel assembly (6) is formed in a quadrangular shape in cross section, being configured with, for example, a 17×17 cells (20). Among the 17×17 cells (20), the control rods (14) are respectively inserted in 24 cells (20), and the incore nuclear instrumentation (15) is inserted in the cell (20) at the center of the assembly. The cell (20) in which the control rod (14) is inserted is referred to as a control-rod guide tube, and the cell (20) in which the incore nuclear instrumentation (15) is inserted is referred to as an instrumentation guide tube. The fuel rods (10) are respectively inserted in the other cells (20). If the fuel assembly (6) is used in a boiling water reactor (BWR), the outside of the fuel assembly (6) is covered with a channel box. On the other hand, if the fuel assembly (6) is used in a pressured water reactor (PWR), the outside of the fuel assembly (6) is opened. There exists an inter-assembly gap (12) on the outside of the channel box in the case of the BWR and the outside of the fuel assembly (6) in the case of the PWR.

The fuel rod (10) is constituted by a plurality of fuel pallets, and is inserted in the cylindrical cladding tube (11). The fuel pallet is obtained by making uranium 235 as the nuclear fuel a predetermined enrichment, fusing the uranium 235 to obtain uranium dioxide, and forming the uranium dioxide into a pellet. Although the uranium 235 is used as the nuclear fuel in the present embodiment, the nuclear fuel is not limited to the uranium 235, but, for example, fissionable material such as plutonium can be used instead. In addition, the fuel pallet includes gadolinium that is burnable poison. The burnable poison is material having high neutron absorption capability, which loses the neutron absorption capability with a neutron absorption reaction. The burnable poison includes gadolinium (Gd), boron (B), erbium (Er), and dysprosium (Dy).

The nuclear-constant calculation code (50) is constituted by a two-dimensional transport calculation code corresponding to a heterogeneous system of the fuel assembly (6), and calculates a neutron flux in the fuel assembly (6), performs a burnup calculation, and performs a nuclear constant calculation by using a neutron transport equation by the method of characteristics (MOC).

The nuclear-constant calculation code (50) is constituted by a resonance calculating program (51), a transport calculating program (52), a burnup calculating program (53), and a nuclear-constant calculating program (54), and is executed by the analyzing apparatus (40). The nuclear-constant calculation code (50) performs various calculations based on specification data related to the fuel assembly (6), which is input to the analyzing apparatus (40), and an effective cross section obtained from a cross section library (55) stored in the storage unit (41) of the analyzing apparatus (40). The specification data includes, for example, the radius of the fuel rod, inter-assembly gap, fuel composition, fuel temperature, and moderator temperature.

The resonance calculating program (51) calculates the effective cross section that becomes input data to the transport calculating program (52), based on the input specification data. The resonance calculating program (51) divides energy of the neutron into a plurality of energy groups and obtains the effective cross section that is an average cross section of each of the divided energy groups, thus calculating the effective cross sections of the groups. This effective cross section is calculated based on a background cross section. That is, the resonance calculating program (51) calculates the background cross section based on the input specification data, and calculates the effective cross section based on the calculated background cross section.

The cross section library (55) is a table of the background cross section and the effective cross section corresponding to each other, provided for each nuclear species. Therefore, when the background cross section is calculated by the resonance calculating program (51), the effective cross section is calculated from the cross section library (55) by using the calculated background cross section as an argument.

The transport calculating program (52) calculates the neutron flux in the analysis target area based on the method of characteristics by using the calculated effective cross section across the groups. The transport calculating program (52) creates a plurality of neutron flight paths on the analysis target area (30), and by solving the neutron transport equation for each of the created neutron flight paths, calculates physical quantities of the neutron flux, the effective multiplication factor, and the infinite multiplication factor. At this time, the transport calculating program (52) uses a scattering cross section as an input value.

The burnup calculating program (53) performs a burnup calculation for tracking generation and extinction of nuclear species in a core. The burnup calculating program (53) evaluates a temporal change of the atom number density of each nuclear species by solving a burnup equation. The atom number density of the next burnup step obtained by the burnup calculation is used as input values to the resonance calculating program and the transport calculating program. With this operation, the burnup calculating program (53) performs tracking of the burnup state (a temporal change of burnup) by performing the burnup calculation and the transport calculation for each predetermined burnup step in a repeated manner.

The nuclear-constant calculating program (54) uses neutron fluxes of the groups in the fuel assembly (6) obtained by the transport calculating program (52) as weights, and contracts and homogenizes effective cross sections of the groups in the fuel assembly (6), to calculate a homogenized macro nuclear constant.

From the above configuration, when performing a burnup calculation by using the nuclear-constant calculation code (50), the analyzing apparatus (40) calculates the effective cross section by executing the resonance calculating program (51). The analyzing apparatus (40) then calculates physical quantities such as the scattering cross section, which will be used as an input value to the transport calculating program (52), from the calculated effective cross section, and by using the calculated physical quantities, calculates physical quantities such as the neutron flux and the effective multiplication factor of the analysis target area (30) by executing the transport calculating program (52). Thereafter, by using the calculated physical quantities, the analyzing apparatus (40) calculates physical quantities such as reaction rate, which will be used as an input value to the burnup calculating program (53), and by using the calculated physical quantities, calculates physical quantities such as the atom number density by executing the burnup calculating program (53).

FIG. 3 is a graph showing an error of a scattering model that can represent a simple neutron scattering with respect to a scattering model that can represent a complicated neutron scattering, and FIG. 4 is a table showing calculation times of the scattering models used in the graph shown in FIG. 3. The scattering model that can represent the complicated neutron scattering is a scattering model that can represent an anisotropic scattering of the neutron. On the other hand, the scattering model that can represent the simple neutron scattering is a scattering model that can represent an isotropic scattering of the neutron. In the graph shown in FIG. 3, the horizontal axis represents an average burnup of the fuel rod (10) included in the fuel assembly (6), and the vertical axis represents an infinite multiplication factor. The scattering model to be evaluated includes a scattering model (nth-order scattering model) defined by Equation (1) that represents an angle dependence of a scattering neutron with spherical surface harmonics. Another scattering model is a scattering model (transport correction model) defined by Equation (2) that represents an anisotropic scattering model by correcting an isotropic scattering model obtained by taking the angle dependence of the scattering neutron as the isotropic scattering.

[Equation 1]

$$Q_s^g(\vec{\Omega}) = \sum_{l=0}^{L} \sum_{g'} \frac{2l+1}{4\pi} \sum_{s,l}^{g'\to g} \sum_{m=-l}^{l} Y_m^l(\vec{\Omega}) \phi_m^{l,g'} \quad (1)$$

L: Legendre order $\Sigma_{s,l}^{g'\to g}$: Macroscopic scattering cross section of neutron when transferring from energy level g' to energy level g $Y_m^l(\vec{\Omega})$: Spherical surface harmonics

[Equation 2]

$$\sum_{tr}^{g} = \sum_{t}^{g} - \sum_{g'} \sum_{s,l}^{g\to g'} \quad (2)$$

$\Sigma_{tr}^g$: Macroscopic transport cross section
$\Sigma_t^g$: Macroscopic total cross section In the graph shown in FIG. 3, the scattering model of the complicated system that serves as a reference is a scattering model in which the Legendre order L is third order in the Equation (1), and a reference line in this scattering model is indicated by P3. As the Legendre order L becomes the higher order, the scattering model can represent more rigorous (complicated) scattering of the neutron. Although the scattering model of P3 evaluates the scattering of the neutron in an accurate manner from an initial stage to a later stage of burnup of the fuel rod (10), as shown in FIG. 4, its calculation time is longer than those of scattering models of P0 and Y1. The figures of the table shown in FIG. 4 are calculation times of scattering models P1, P2, and P3 when the calculation times of the scattering models P0 is set to a reference "1".

On the other hand, the scattering model of P2 to be evaluated is a scattering model in which the Legendre order L is second order, and similarly, the scattering models of P1 and P0 are scattering models in which the Legendre order L are first order and zeroth order, respectively. The scattering model of Y1 is the scattering model defined by the Equation (2). Because these scattering models are lower-order scattering models compared to the scattering model of P3, they represent simpler scatterings than the scattering represented by the scattering model of P3.

As shown in FIG. 3, when the fuel rod (10) includes the burnable poison, because the burnable poison absorbs the neutron at the initial stage of burnup of the fuel rod (10), the neutron shows the anisotropic scattering. At this time, the scattering models of P0, P1, and Y1 can hardly evaluate the infinite multiplication factor as high as the scattering model of P3 in accuracy, while the scattering model of P2 can evaluate the infinite multiplication factor as high as the scattering model of P3 in accuracy. However, as shown in FIG. 4, the calculation time of the scattering model of P2 is still long.

Therefore, in the burnup calculation using the nuclear-constant calculation code (50) according to the present embodiment, the scattering model is selectively used according to the average burnup of the fuel rod (10) included in the fuel assembly (6). In the burnup calculation, the temporal change of the atom number density is calculated by solving the burnup equation using the effective cross section obtained by the resonance calculation and the neutron flux obtained by the transport calculation as input values. In the burnup calculation according to the present embodiment, a burnup state of the fuel rod (10) is tracked by using a predictor-corrector method. The burnup calculation according to the present embodiment are explained in detail below with reference to FIG. 5.

Figure 5:
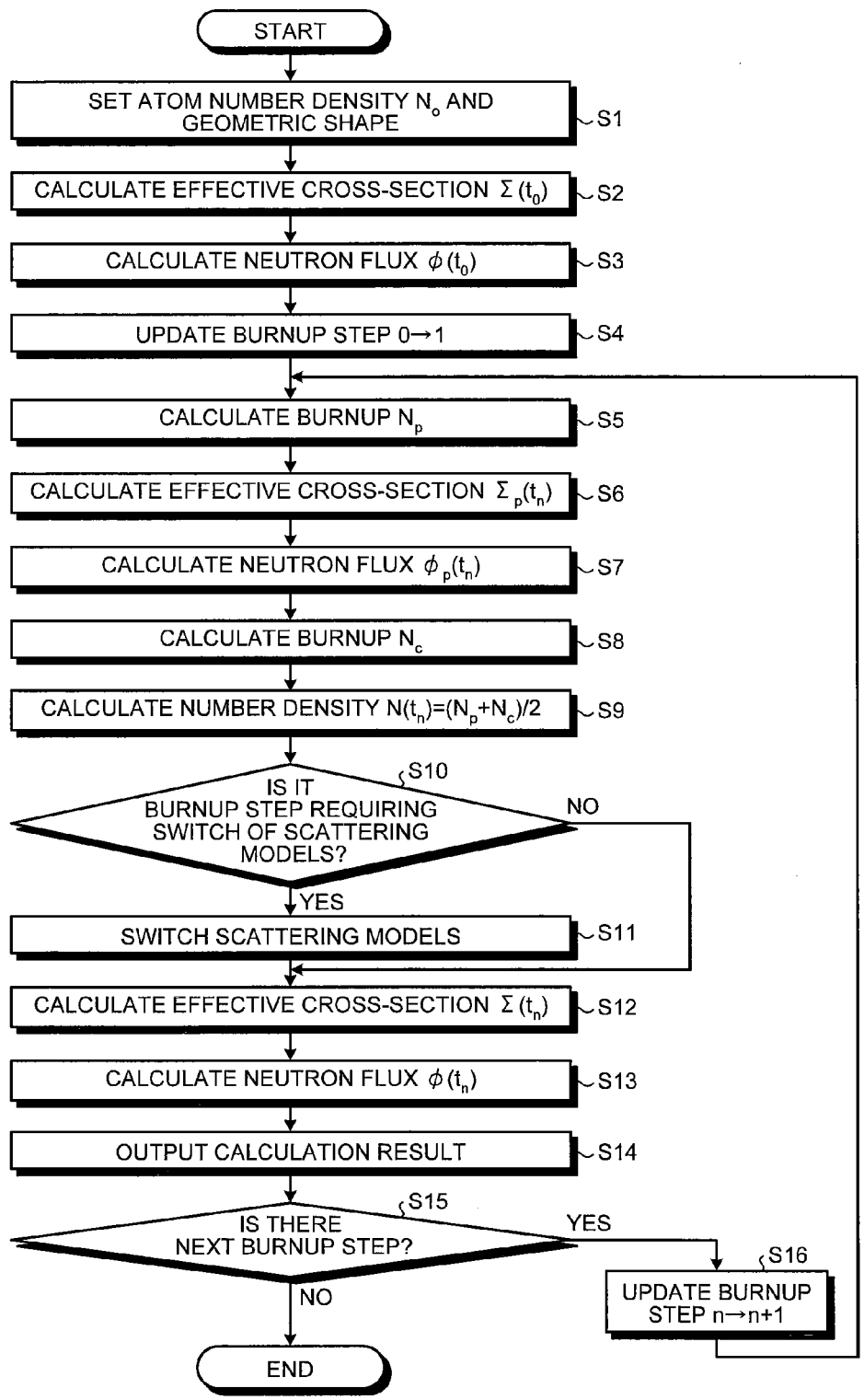
FIG. 5 is a flowchart of a burnup calculation executed using a nuclear-constant calculation code according to the embodiment.

FIG. 5 is a flowchart of the burnup calculation executed using the nuclear-constant calculation code according to the present embodiment. When performing the burnup calculation, the analyzing apparatus (40) first sets an atom number density $N_o$ at the initial state and geometric shape of the analysis target area, which are calculated in advance, as input values at the initial stage to be used in the burnup calculation (Step S1). Subsequently, the analyzing apparatus (40) calculates an effective cross section $\Sigma(t_o)$ at an initial burnup step $t_o$ based on the atom number density $N_o$ and the geometric shape set at Step S1 (Step S2). Thereafter, the analyzing apparatus (40) calculates the scattering cross section by using the scattering model (second scattering model) that represents the complicated scattering, for example, the scattering model P2 or the scattering model P1, from the calculated effective cross section $\Sigma(t_0)$, and calculates neutron flux $\phi(t_0)$ of the analysis target area 30 at the initial burnup step $t_0$ based on a characteristic curve method by using the calculated scattering cross section (Step S3: first nuclear-characteristic calculating step).

Subsequently, the analyzing apparatus (40) updates the burnup step from the initial burnup step $t_0$ to a next burnup step $t_n$ (n=1) to evaluate the burnup state at the next burnup step $t_n$ (Step S4). After updating the burnup step, the analyzing apparatus (40) calculates an atom number density $N_p$ that serves as a predictor by performing a burnup calculation based on the effective cross section $\Sigma(t_{n-1})$ (n=1) and the neutron flux $\phi(t_{n-1})$ respectively calculated at Steps S2 and S3 (Step S5).

Thereafter, the analyzing apparatus (40) calculates an effective cross section $\Sigma_P(t_n)$ at the burnup step $t_n$ (n=1) by using the calculated atom number density $N_p$ (Step S6). The analyzing apparatus (40) then calculates the scattering cross section from the calculated effective cross section $\Sigma_P(t_n)$ by using the scattering model that represents the complicated scattering, and calculates neutron flux $\phi_P(t_n)$ of the analysis target area (30) at the burnup step $t_n$ (n=1) based on the characteristic curve method by using the calculated scattering cross section (Step S7). The analyzing apparatus (40) then calculates an atom number density $N_C$ that serves as a corrector by performing a burnup calculation based on the effective cross section $\Sigma_P(t_n)$ and the neutron flux $\phi_P(t_n)$ respectively calculated at Steps S6 and S7 (Step S8).

After calculating the atom number density $N_P$ that serves as the predictor and the atom number density $N_C$ that serves as the corrector, the analyzing apparatus (40) calculates an atom number density $N(t_n)$ that is an average of the atom number density $N_p$ and the atom number density $N_C$ (Step S9). Subsequently, the analyzing apparatus (40) determines whether it is a set burnup step (set burnup) for switching the scattering models (Step S10). The set burnup step is a burnup step corresponding to a predetermined average burnup B in the graph shown in FIG. 3. If it is the set burnup step, the analyzing apparatus (40) switches the scattering model that represents the complicated scattering to the scattering model (first scattering model) that represent the simple scattering, for example, the scattering model P0 or the scattering model Y1 (Step S11: scattering-model switching step). On the other hand, if it is not the set burnup step, the analyzing apparatus (40) does not perform Step S11, that is, moves to Step S12 described later, without switching the scattering models.

The analyzing apparatus (40) then calculates an effective cross section $\Sigma(t_n)$ at the burnup step $t_n$ (n=1) by using the calculated atom number density $N(t_n)$ (Step S12). Thereafter, the analyzing apparatus (40) calculates the scattering cross section from the calculated effective cross section $\Sigma(t^n)$ by using the scattering model set at Steps S10 and S11, and calculates neutron flux $\phi(t_n)$ of the analysis target area 30 at the burnup step $t_n$ (n=1) based on the characteristic curve method by using the calculated scattering cross section (Step S13: second nuclear-characteristic calculating step).

Subsequently, the analyzing apparatus (40) outputs the nuclear characteristics such as the atom number density $N(t_n)$ calculated at Step S9, the effective cross section $\Sigma(t_n)$ calculated at Step S12, and the neutron flux $\phi(t_n)$ calculated at Step S13 as a calculation result (Step S14). Thereafter, the analyzing apparatus (40) determines whether there is a next burnup step $t_{n+1}$ (Step S15). If there is the next burnup step $t_{n+1}$, the analyzing apparatus (40) updates the burnup step from the burnup step $t_n$ to the next burnup step $t_{n+1}$ (Step S16). In the burnup step $t_{n+1}$, the analyzing apparatus (40) calculates an atom number density $N_p$ that serves as a predictor by performing a burnup calculation based on the effective cross section $\Sigma(t_n)$ and the neutron flux $\phi(t_n)$ respectively calculated at Steps S2 and S3 (Step S5). On the other hand, if there is no next burnup step $t_{n+1}$, the analyzing apparatus (40) ends the burnup calculation.

At the time of switching the scattering models, when calculating the atom number density $N_P$ that serves as the predictor and the atom number density $N_C$ that serves as the corrector, the analyzing apparatus (40) calculates the atom number density $N_P$ that serves as the predictor by using the scattering model that represents the complicated scattering before switching the scattering models, and thereafter calculates the atom number density $N_C$ that serves as the corrector by using the scattering model that represents the simple scattering after switching the scattering models.

Specifically, when calculating the atom number density $N_P$, the analyzing apparatus (40) uses the effective cross section and the neutron flux calculated using the scattering model before switching the scattering models as the input values at Step S5. On the other hand, when calculating the atom number density $N_C$, the analyzing apparatus (40) uses the effective cross section and the neutron flux calculated using the scattering model after switching the scattering models as the input values at Step S8.

Figures 6, 7:
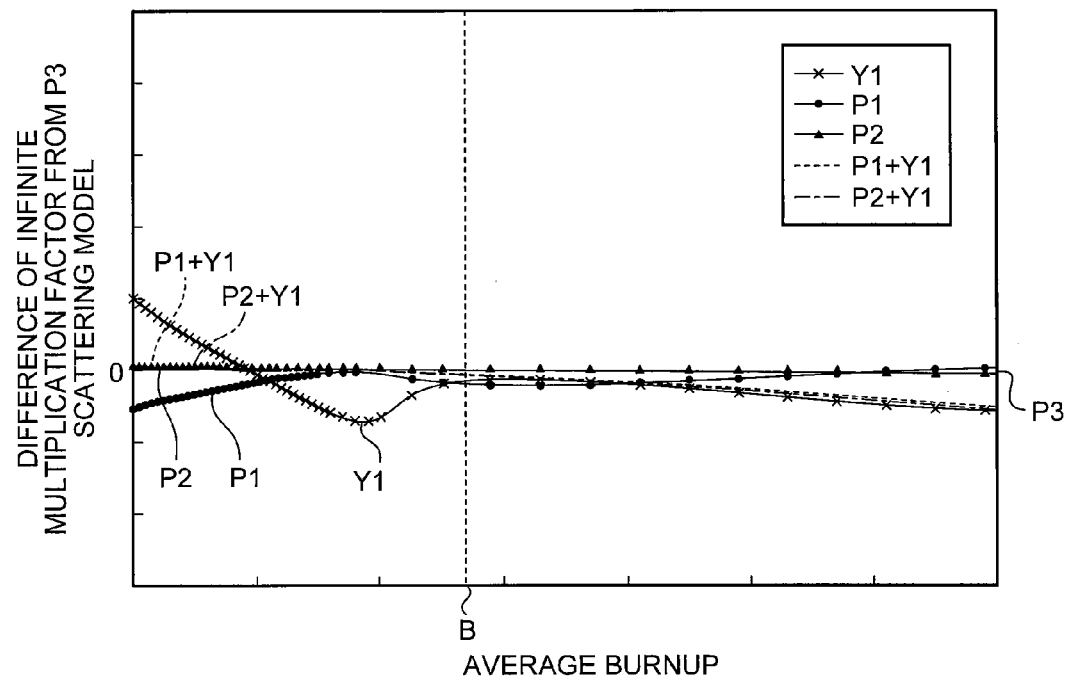
FIG. 6 is a graph showing an error of a scattering model that can represent a simple neutron scattering with respect to a scattering model that can represent a complicated neutron scattering.
FIG. 7 is a table showing calculation times of scattering models.

An evaluation of the calculation accuracy after switching the scattering models is explained with reference to FIGS. 6 and 7. FIG. 6 is a graph showing an error of the scattering model that can represent the simple neutron scattering with respect to the scattering model that can represent the complicated neutron scattering, and FIG. 7 is a table showing calculation times of the scattering models used in the graph shown in FIG. 6.

The graph shown in FIG. 6 is the same as the graph shown in FIG. 3, where (P1+Y1) indicates a curve obtained when the scattering model is switched from the scattering model of P1 to the scattering model of Y1, and (P2+Y1) indicates a curve obtained when the scattering model is switched from the scattering model of P2 to the scattering model of Y1. As shown in FIG. 6, it has been confirmed that the curves of (P1+Y1) and (P2+Y1) evaluate the infinite multiplication factor of the neutron as high as the scattering model of P3 in accuracy. At this time, as shown in FIG. 7, the calculation time when the scattering model is switched from the scattering model of P1 to the scattering model of Y1 is shortened compared to the case of using the scattering model of P1 only, and similarly, the calculation time when the scattering model is switched from the scattering model P2 to the scattering model Y1 is shortened compared to the case of using the scattering model of P2 only.

With the above configuration, before the burnable poison loses the neutron absorption capability, the nuclear-constant calculation code (50) according to the present embodiment can evaluate the behavior of the neutron at the time of scattering in an accurate manner by using a scattering model that represents a complicated scattering, such as the scattering model P2 or P1 because the neutron shows the anisotropic scattering so that the scattering of the neutron becomes complicated. On the other hand, after the burnable poison loses the neutron abruption capability, the nuclear-constant calculation code (50) according to the present embodiment can evaluate the behavior of the neutron at the time of scattering in an accurate manner by using a scattering model that represents a simple scattering, such as the scattering model P0 or Y1 because influence of the anisotropic scattering of the neutron is decreased so that the scattering of the neutron becomes simple. With this operation, it is possible to shorten the calculation time without degrading the calculation accuracy compared to the case of evaluating the nuclear characteristic by using the higher-order scattering model only as the conventional case.

Furthermore, with the configuration according to the present embodiment, upon switching the scattering models, the analyzing apparatus (40) calculates the atom number density $N_P$ that serves as the predictor by using the scattering model that represents the complicated scattering before switching the scattering models, and thereafter calculates the atom number density $N_C$ that serves as the corrector by using the scattering model that represents the simple scattering after switching the scattering models. With this operation, because the atom number density $N(t_n)$ that is the average of the atom number density $N_P$ and the atom number density $N_C$ can be taken as a value obtained considering the scattering model that represents the complicated scattering and the scattering model that represents the simple scattering, it is possible to suppress a shift of the atom number density $N(t_n)$ due to the switch of the scattering models. Therefore, the analyzing apparatus (40) can suppress a discontinuity of the nuclear characteristic such as the atom number density $N(t_n)$ to be calculated even at the time of switching the scattering models.

Although the nuclear-constant calculation code (50) according to the present embodiment has been applied to a case of performing a burnup calculation, as long as it is a case of calculating the nuclear characteristic using a scattering model, it can be applied to a calculation of any nuclear characteristic. In addition, although gadolinium is used as the burnable poison in the present embodiment, other types of burnable poison can be used instead. Similarly, while uranium is used as the nuclear fuel in the present embodiment, a nuclear fuel including plutonium can be used instead.

REFERENCE SIGNS LIST 6 fuel assembly
10 fuel rod
11 cladding tube
12 inter-assembly gap
13 moderator
14 control rod
15 incore nuclear instrumentation
20 cell
30 analysis target area
40 analyzing apparatus
41 storage unit
50 nuclear-constant calculation code
51 resonance calculating program
52 transport calculating program
53 burnup calculating program
54 nuclear-constant calculating program
55 cross section library

The invention claimed is:

1. A non-transitory computer readable media, comprising a nuclear-characteristic calculating program executable by a processor for calculating a nuclear characteristic of a fuel rod that contains nuclear fuel and burnable poison that loses neutron absorption capability with a neutron absorption reaction of absorbing a neutron, wherein the nuclear-characteristic calculating program includes:

a first scattering model representing an isotropic scattering of the neutron with lighter calculation load than the calculation load of a second scattering model as a selected scattering model for representing isotropic scattering of the neutron;

the second scattering model representing an anisotropic scattering of the neutron with heavier calculation load than the calculation load of the first scattering model as the selected scattering model for representing anisotropic scattering of the neutron;

a first nuclear-characteristic calculation module for calculating, when a burnup of the fuel rod is before a set burnup at which the burnable poison is considered to lose the neutron absorption capability, the nuclear characteristic of the fuel rod by using the second scattering model;

a scattering-model switching module for switching, when the burnup of the fuel rod is the set burnup, the selected scattering model from the second scattering model to the first scattering model; and a second nuclear-characteristic calculation module for calculating, after switching the selected scattering model, the nuclear characteristic of the fuel rod by using the first scattering model, wherein each of the first nuclear-characteristic calculating module and the second nuclear-characteristic calculating module calculates the nuclear characteristic of the fuel rod based on a prediction nuclear characteristic that serves as a predictor and a correction nuclear characteristic that serves as a corrector, and at a time of performing the scattering-model switching, the nuclear characteristic of the fuel rod is calculated based on the prediction nuclear characteristic calculated by the first nuclear-characteristic calculating module using the second scattering model and the correction nuclear characteristic calculated by the second nuclear-characteristic calculating module using the first scattering model.

2. An analyzing apparatus comprising the non-transitory computer readable media of claim 1 being configured to execute the nuclear-characteristic calculating program.

* * * * *